(12) United States Patent
Wugofski

(10) Patent No.: US 6,201,538 B1
(45) Date of Patent: Mar. 13, 2001

(54) CONTROLLING THE LAYOUT OF GRAPHICS IN A TELEVISION ENVIRONMENT

(75) Inventor: Theodore D. Wugofski, Fort Worth, TX (US)

(73) Assignee: Amiga Development LLC, North Sioux City, SD (US)

( * ) Notice: Subject to any disclaimer, the term of this patent is extended or adjusted under 35 U.S.C. 154(b) by 0 days.

(21) Appl. No.: 09/002,994

(22) Filed: Jan. 5, 1998

(51) Int. Cl.[7] .................................................. G06F 3/14
(52) U.S. Cl. ...................... 345/327; 345/113; 345/342; 345/433; 345/435; 348/552; 348/568; 348/600; 709/217
(58) Field of Search ...................................... 348/552, 553, 348/554, 563, 569, 589, 600, 564, 565, 568, 586, 704, 906, 473, 10, 7; 345/327, 342, 346, 113, 435, 433, 343; 709/217

(56) References Cited

U.S. PATENT DOCUMENTS

| 5,544,301 | * | 8/1996 | Orton | 395/157 |
| 5,548,340 | * | 8/1996 | Bertram | 348/559 |
| 5,627,978 | * | 5/1997 | Altom | 395/330 |
| 5,659,350 | | 8/1997 | Hendricks et al. | 348/6 |
| 5,659,793 | * | 8/1997 | Escobar | 395/807 |
| 5,729,704 | * | 3/1998 | Stone | 345/346 |
| 5,734,589 | * | 3/1998 | Krostreski | 345/327 |
| 5,734,835 | * | 3/1998 | Selker | 395/200 |
| 5,761,673 | * | 6/1998 | Booman | 707/104 |
| 5,767,849 | * | 6/1998 | Borgendale | 345/335 |
| 5,774,666 | * | 6/1998 | Portuesi | 348/473 |
| 5,796,969 | * | 10/1998 | Orton | 345/343 |
| 5,818,441 | * | 10/1998 | Throckmorton et al. | 345/328 |
| 5,826,166 | * | 10/1998 | Brooks | 348/10 |
| 5,973,684 | * | 10/1999 | Brooks | 345/327 |
| 5,973,702 | * | 10/1999 | Orton | 345/433 |
| 5,987,509 | * | 1/1999 | Portuesi | 709/217 |

FOREIGN PATENT DOCUMENTS 0746152   12/1996   (EP) .
0810579   12/1997   (EP) .

OTHER PUBLICATIONS

"Verknupfung von TV mit Internet", *Forshung & Entwicklung*, pp. 70–71.

* cited by examiner

*Primary Examiner*—Mark R. Powell
*Assistant Examiner*—Wesner Sajous
(74) *Attorney, Agent, or Firm*—Schwegman, Lundberg, Woessner & Kluth, P.A.; Kenneth J. Cool

(57) ABSTRACT

The present invention utilizes a graphics layout language that is defined by the broadcaster or the studio to control the layout of graphic overlays in relation to corresponding images presented on a display. Each user interface component is divided into objects that define their individual behaviors and presentations. Data files using the hypertext markup language, HTML, layout these objects on the screen. By varying the HTML data files, control is provided to the broadcaster over what objects are displayed on the screen, where they are placed on the screen, and to a limited effect, their behavior. This can be accomplished without re-writing the executables as would be necessary in other television type user interface implementations.

6 Claims, 10 Drawing Sheets

CONTROLLING THE LAYOUT OF GRAPHICS IN A TELEVISION ENVIRONMENT

Related Applications

This application relates to the co-pending, co-filed, and co-assigned applications entitled "System for using a channel and event overlay for invoking channel and event related functions," "Multipurpose channel banner," "Displaying layered information using lenticular-like interfaces," and "Mutatably transparent controls," all of which are hereby incorporated by reference.

TECHNICAL FIELD OF THE INVENTION

The present invention relates generally to graphical user interfaces and in particular to controlling the layout of graphics in a television environment.

BACKGROUND OF THE INVENTION

In the majority of television viewing environments today, when a user tunes to a specific channel, the graphical interface for that channel is defined primarily by the television manufacturer. For example, when a broadcaster displays a station identifying logo with their video transmission, they have no control over the positioning of their logo. Many times this logo is covered by a user selected menu option when overlaid on the television screen with the transmitted video.

In recent environments, graphical interfaces have provided a greater level of functionality with the advent of direct satellite system set top boxes (STB), such as DSS and Echostar. In addition to television displays, the user has channel banners, menus, electronic program guides and message alerts. In some circumstances, such as with inclement weather announcements and breaking news events, the user may customize the interface. However, the amount of functionality presented by these graphical interfaces is minimal since there is little interaction by a user, other than changing the channel or adjusting the volume.

In particular, these functions provided by an STB manufacturer occupy a portion of the display screen when selected by the user, such that the television broadcaster's logo or call letters are very likely to be covered up if displayed on the display screen at the same time a user is operating the electronic program guide, for example. The broadcasters have no control over the positioning of their station identifying information or other types of data they may wish to have in full view when displayed concurrently with user selected display options. With the DSS and Echostar systems, the additional user interfaces have been designed and implemented by STB manufacturers with little regard for the needs or concerns of the television broadcaster.

Therefore, there is a direct conflict between the manufacturer's need to define the various functions provided by a direct satellite STB and the broadcaster's need to broadcast unobstructed graphical symbols and other information to viewers.

Furthermore, this problem is not just limited to television broadcasts and receptions within the United States, but worldwide. This tension between the manufacturers and the broadcasters will increase as the boundaries of televisions and computing devices blur with the evolution of televisions adapting to the digital age and as data services become more readily available.

This convergence between televisions and computers can be illustrated by the efforts of Microsoft and Intel, where efforts have been made in developing strategies and approaches for integrating televisions into the personal computer (PC). For instance, Broadcast PC has been developed by Microsoft and Intel has developed Intercast, but they do not allow for the broadcaster's total control of the television environment. In both developments, a broadcaster is limited to controlling the look and feel of their services, but has no control of their primary product, which is the broadcast event.

Windows CE, OS-9 and OpenTV are all operating systems that are attempting to deliver more sophisticated user interfaces to the manufacturer, but they too are disregarding the needs of the broadcaster. These operating systems still cover up the broadcast content with banners and menus that are genericized to the lowest common denominator of services and functions offered.

Therefore, there is a need to permit broadcasters to have greater control in the television environment they transmit to their viewers. Specifically, there is a need for the broadcasters to broadcast unobstructed graphical symbols and other information to viewers.

SUMMARY OF THE INVENTION

The above mentioned shortcomings as well as other problems are addressed by the present invention which will be understood by reading and studying the following specification. The invention describes a computerized system for controlling graphics in a television environment.

In one embodiment of the invention, the computerized system comprises a hardware component having a personal computer (PC) mode and a television (TV) mode, a computer-readable medium and a graphical user interface component for viewing the television mode. Also included is an application program executed by the hardware component from the computer-readable medium, wherein each application program independently controls the layout of graphics displayed via the graphical user interface when overlaid with a video image provided by the hardware component operating in the television mode.

A graphics layout language, such as hypertext markup language (HTML), is used to layout graphical user interface components and manage behaviors of displayed graphics in the television environment. Control of the graphics display allows a broadcaster to reposition their graphical symbols and other information to be overlaid with the broadcaster's corresponding transmitted television video. The invention is particularly beneficial when reposition of the broadcaster's graphics is necessary if a manufacturer's selection of user selected options to be displayed on a screen covers part or all of the broadcaster's displayed graphics.

Therefore, utilization of a graphics layout language defined by the broadcaster allows control on the layout of graphic overlays in relation to corresponding images presented on a display. In different embodiments of the invention, computers, computerized systems and computer-readable media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Figure 1:
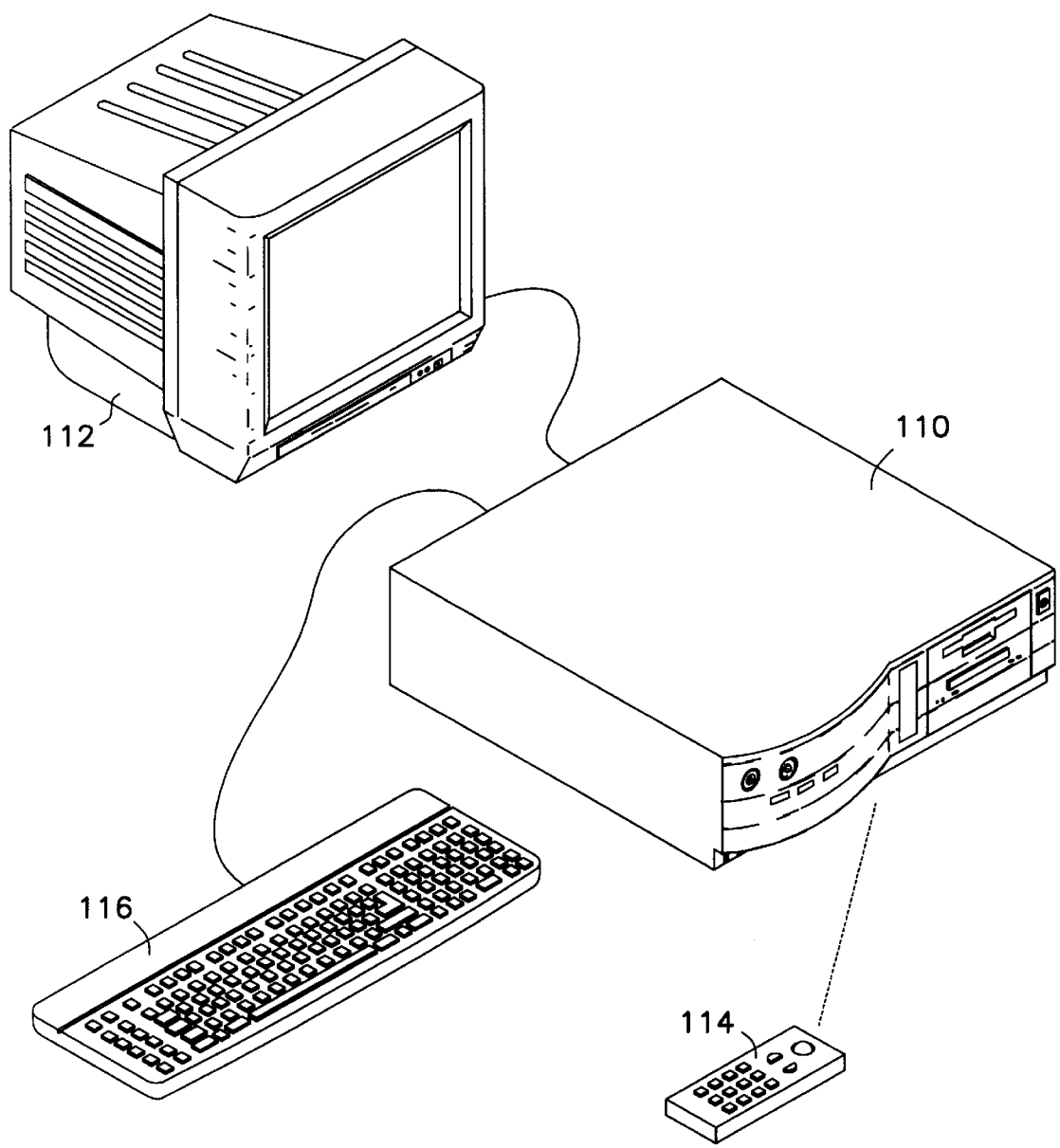
FIG. 1 is a diagram of a typical computer in conjunction with which embodiments of the invention may be implemented.

Referring first to FIG. 1, a diagram of a typical computer in conjunction with which embodiments of the invention may be implemented is shown. Computer 110 is operatively coupled to monitor 112, pointing device 114, and keyboard 116.

Computer 110 includes integrated therein or coupled thereto hardware to provide for what is known in the art as a "convergence environment" such that computer 110 provides capability beyond ordinary PC operation. To implement the present invention, television capability must be included as part of this convergence environment. Such hardware components are known and available within the art. For example, the Gateway Destination PC/TV system, available from Gateway 2000, Inc., provides a convergence environment across two primary modes of operation: TV viewing and PC operation.

Embodiments of the present invention are amenable to inclusion into and/or development in conjunction with a software architecture of a computerized convergence system as described in co-assigned and co-filed application titled "Architecture for Convergence Systems," which is hereby incorporated by reference.

In addition to television capability, computer 110 includes a processor (for example, an Intel Pentium processor), random-access memory (RAM) (preferably, at least thirty-two megabytes), read-only memory (ROM), and one or more storage devices, such as a hard disk drive, a floppy disk drive into which a floppy disk can be inserted, an optical disk drive, and a tape cartridge drive. The memory, hard drives, floppy disks, etc., are types of computer-readable media. The invention is not particularly limited to any type of computer 110. Computer 110 preferably is a PC-compatible computer running an operating system such as Microsoft Windows. The construction and operation of such computers are well known within the art.

To support television viewing capability, computer 110 includes a TV tuner and/or a cable decoder. Computer 110 desirably provides for integration with or includes audio/video (i.e., multimedia) devices including but not limited to: a sound card, a digital video disc (DVD) player, a direct broadcast satellite (DBS) receiver, audio/video inputs for external or auxiliary devices, a CD-ROM player, an audio/video tuner having at least radio tuning capability, a video cassette recorder, a laser disc player, a compact disc player, a DBS integrated receiver-decoder (IRD), and a video camera.

Computer 110 may also be communicatively connected to the Internet, any particular manner by which the invention is not limited to, and which is not shown in FIG. 1. Internet connectivity is well known within the art. In one embodiment, the computer includes a modem and corresponding communication drivers to connect to the Internet via what is known in the art as a "dial-up connection." In another embodiment, the computer includes an Ethernet or similar hardware card to connect to a local-area network (LAN) that itself is connected to the Internet via what is known in the art as a "direct connection" (e.g., T1 line, etc.). Other embodiments of "direct connections" include connection through satellites and connection via a cable modem.

Monitor 112 permits the display of information, including computer, video and other information, for viewing on a screen by a user of the computer. The invention is not limited to any particular monitor 112. Such monitors include cathode ray tube (CRT) displays, as well as flat panel displays such as liquid crystal displays (LCD's).

Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks.

Finally, from a hardware perspective, keyboard 116 permits entry of textual information into computer 110, as known within the art, and the invention is not limited to any particular type of keyboard. Desirably, keyboard 116 is a wireless keyboard.

Computer 110 also has at least one hypertext-markup-language (HTML) operating environment running thereon, which may utilize the Internet connectivity. Such operating environments are typically software such as Netscape Navigator and Microsoft Internet Explorer, both of which provide an HTML operating environment, and also access to the Internet's world-wide web (WWW), Usenet newsgroups and electronic mail features. The invention is not limited to any particular HTML operating environment, however, and the construction and use of such operating environments are well known within the art.

Figure 2:
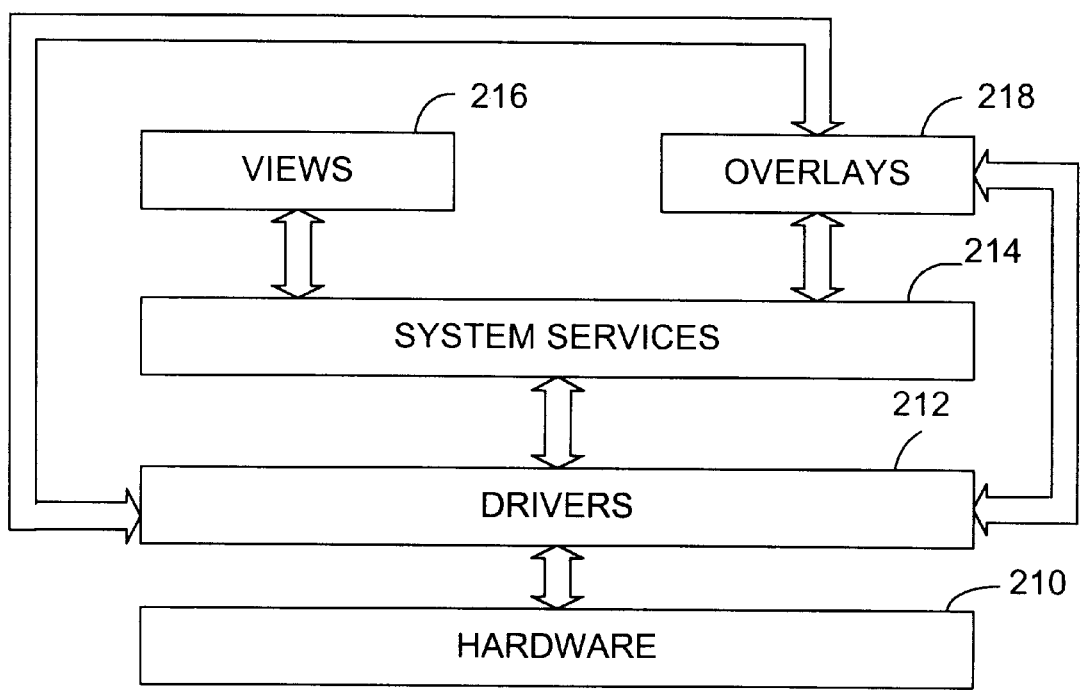
FIG. 2 is a diagram of a computerized system for a convergence environment.

Referring next to FIG. 2, a diagram of a computerized system for a convergence environment allowing for the control of graphics in a television environment is shown. The computerized system includes the following components: hardware component 210, drivers component 212, system services component 214, views component 216 and overlays component 218. Each of these components is described in general within the following paragraphs.

Hardware component 210 includes the necessary hardware to provide the convergence environment in which personal computer 110 is integrated with television capability. Such hardware components are known and available within the art. As previously stated, the Gateway Destination PC/TV system, available from Gateway 2000, Inc., provides a convergence environment system in which TV and PC capabilities are included.

Drivers component 212 provides a plurality of drivers, which include low-level functionality that cooperate directly with hardware component 210 of the computerized system. The drivers thus provide the manner by which the other components of the software architecture interface with hardware component 210. The drivers act as the lowest level of abstraction within the software architecture. Examples of drivers include application programming interfaces (API's), as known within the art, such as those available within Microsoft Windows and available from other operating systems.

Systems services component 214 interfaces with drivers 212 to provide a plurality of system services, which include functions and user interfaces shared by multiple views provided by views component 216 and multiple overlays provided by overlays component 218. System services also include functions that may provide a hardware abstraction layer that is not provided by the drivers of drivers component 212. That is, system services component 214 provides a hardware abstraction layer so that views component 216 and overlays component 218 do not have to directly access hardware component 210 or drivers component 212 and/or also provides a set of commonly used functions and user interfaces to views component 216 and overlays component 218.

View component 216 provides a plurality of views, which are full-screen graphical user interfaces that define a context for a user of the computerized system. Examples of views include a full-screen TV window, in which a television station may be viewed to provide the TV context for implementation of the present invention, and the standard PC window, such as a windows desktop in the case of Microsoft Windows 95 to provide a PC context. Views are graphical user interfaces that may be associated with a given application or applications, and are specific to that application or applications.

Overlays component 218 provides a plurality of overlays, which are partial screen graphical user interfaces displayed consistently across all views and modes of operation. That is, while a view is specific to a given application—such as a TV window, or a PC window—an overlay is displayed regardless of the selected view. It is laid over the current view, and is not specific to the view. Examples of overlays include a channel banner, which displays the current channel which is being tuned to, and a favorites list, which displays a list of favorite channels. Note that both overlays and views are considered user interfaces of the software architecture, and overlays component 218 and view component 216 may be conceptualized as a user interface component.

Referring to FIG. 3, the present invention utilizes a graphics layout language, such as HTML, that is defined by the broadcaster or the studio to control the layout of the overlays in relation to the image presented on screen 1. With respect to the present invention, the image is television video.

Figure 3A:
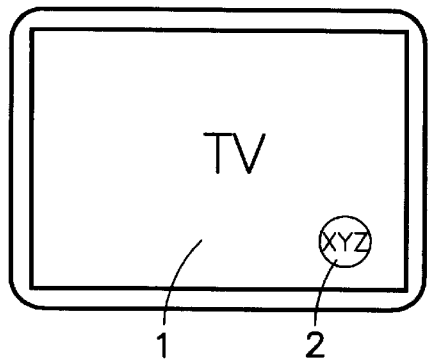
FIGS. 3(a)–(c) illustrate a HTML-pseudocode controlling the display of an XYZ logo when displayed on a screen.
Figure 3B:
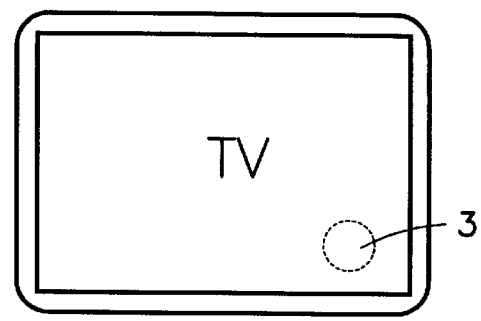
Figure 3C:
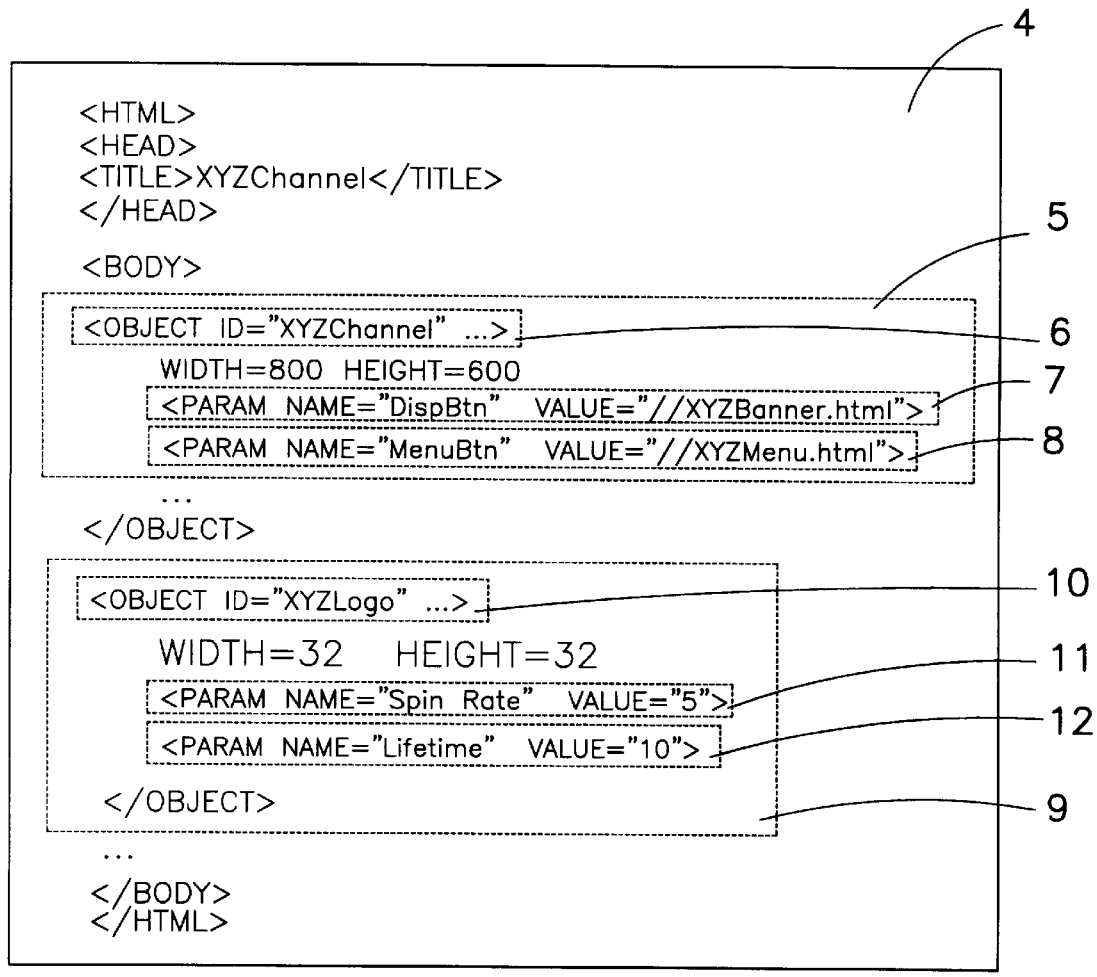

FIG. 3 illustrates HTML-pseudocode 4 used to control the display of the XYZ logo 2 when displayed on screen 1. When the user tunes to the XYZ channel, XYZ logo 2 appears for several seconds in FIG. 3(a) before disappearing 3 in FIG. 3(b). This behavior is defined by HTML-pseudocode 4, as illustrated in FIG. 3(c).

HTML-pseudocode 4 illustrates TV object 5 that contains several attributes: object 6 and two behaviors 7,8 for object 6. First behavior 7 states that if the user selects the "display button" on pointing device 114, the "XYZBanner" HTML document is displayed. Second behavior 8 states that if the user selects the "menu button" on pointing device 114, the "XYZMenu" HTML document is displayed.

Second object 9 describes the XYZLogo that appears temporarily when the channel is selected. First parameter 11 describes the rate at which logo 2 spins. Second parameter 12 describes how long logo 2 is displayed before disappearing.

Figure 4A:
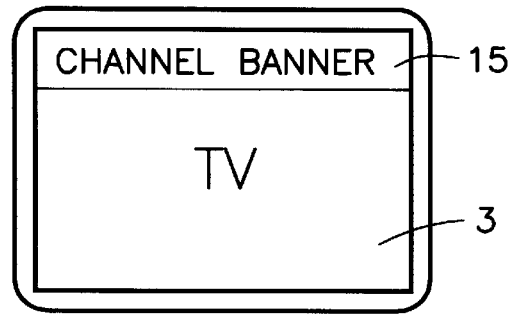
FIGS. 4(a)–(b) illustrate a HTML-pseudocode providing a channel banner that partially covers a television video.
Figure 4B:
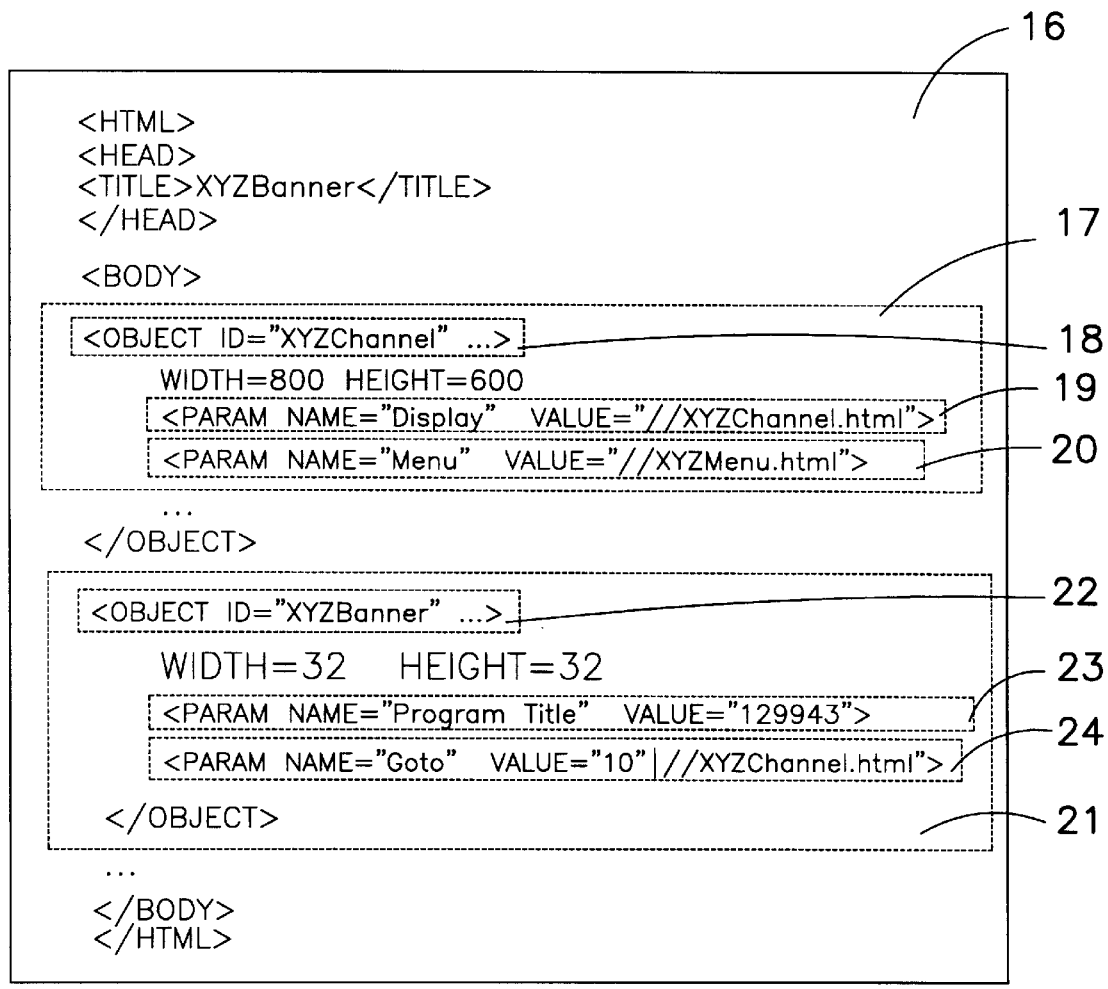

If the user selects the "display button" on pointing device 114, the screen illustrated in FIG. 4(a) appears. FIG. 4(b) illustrates HTML-pseudocode 16 providing channel banner 15 that partially covers television video 14. An inventive aspect of this invention is that the broadcaster can define not only how banner 15 is to be presented (in terms of its contents), but the broadcaster can control the size, position and relationship between banner 15 and television video 14. For example, the broadcaster has complete control over such decisions as to whether banner 15 should be transparent or opaque, oriented vertically or compress the video rather than overlaying it. Alternatively, if the broadcaster did not provide banner 15 behavior, the manufacturer could provide a default position.

The sample HTML-pseudocode 16 in FIG. 4(b) describes a screen that includes TV object 17 and banner object 21. TV object 17 displays XYZ channel video 18 at full screen and has two behaviors. First behavior 19 states that if the user selects the "display button" on pointing device 114, the "XYZChannel" HTML document is redisplayed, thus hiding banner 15. Second behavior 20 states that if the user selects the "menu button" on pointing device 114, the "XYZMenu" HTML document is displayed.

Second object 21 describes XYZ Banner object 22 that appears temporarily at the top of the screen. First parameter 23 identifies the current program, which may be stored in an electronic program guide (EPG) database. Second parameter 24 describes how long banner 15 is displayed before transitioning back to the channel.

Figure 5A:
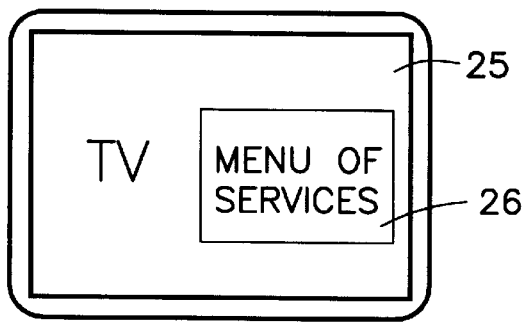
FIGS. 5(a)–(b) illustrate a HTML-pseudocode providing a menu which overlays a television video.
Figure 5B:
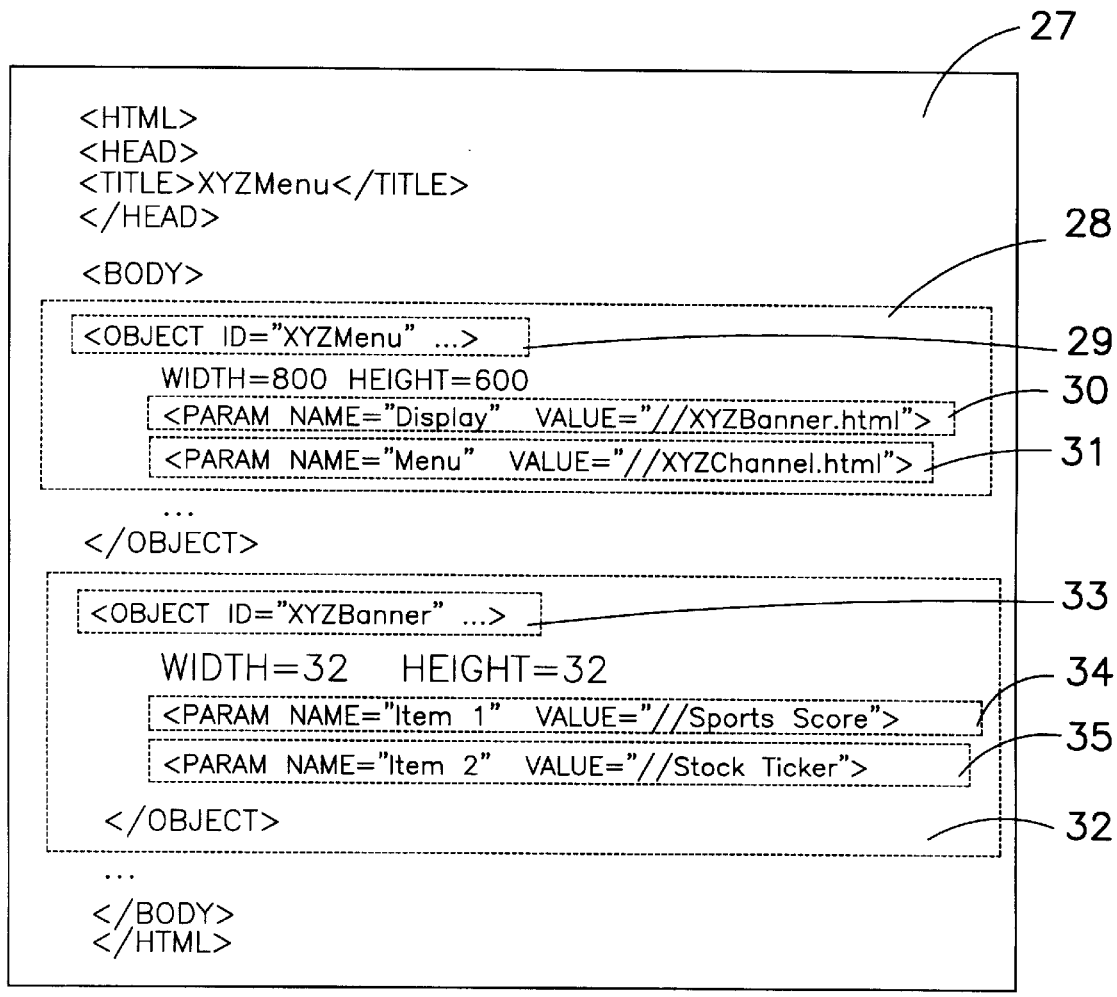

If the user selects the "menu button" on pointing device 114, the screen illustrated in FIG. 5(a) appears. FIG. 5(b) illustrates an HTML-pseudocode 27 providing menu 26 which overlays television video 25.

Sample HTML-pseudocode 27 in FIG. 5(b) describes TV object 28 and menu object 32. TV object 28 displays XYZ channel 29 video at full screen and has two behaviors. First behavior 30 states that if the user selects the "display button" on pointing device 114, the "XYZBanner" HTML document is displayed. Second behavior 31 states that if the user selects the "menu button" on pointing device 114, the "XYZChannel" HTML document is re-displayed.

Second object 32 describes how XYZ Menu 33 appears temporary at the side of the screen. First parameter 34 identifies the name of the first menu item, and second parameter 35 identifies the name of the second menu item.

Figure 6A:
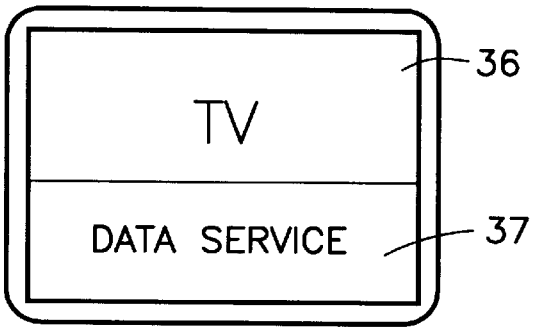
FIGS. 6(a)–(b) illustrate a HTML-pseudocode providing a data services display area which overlays a television video.
Figure 6B:
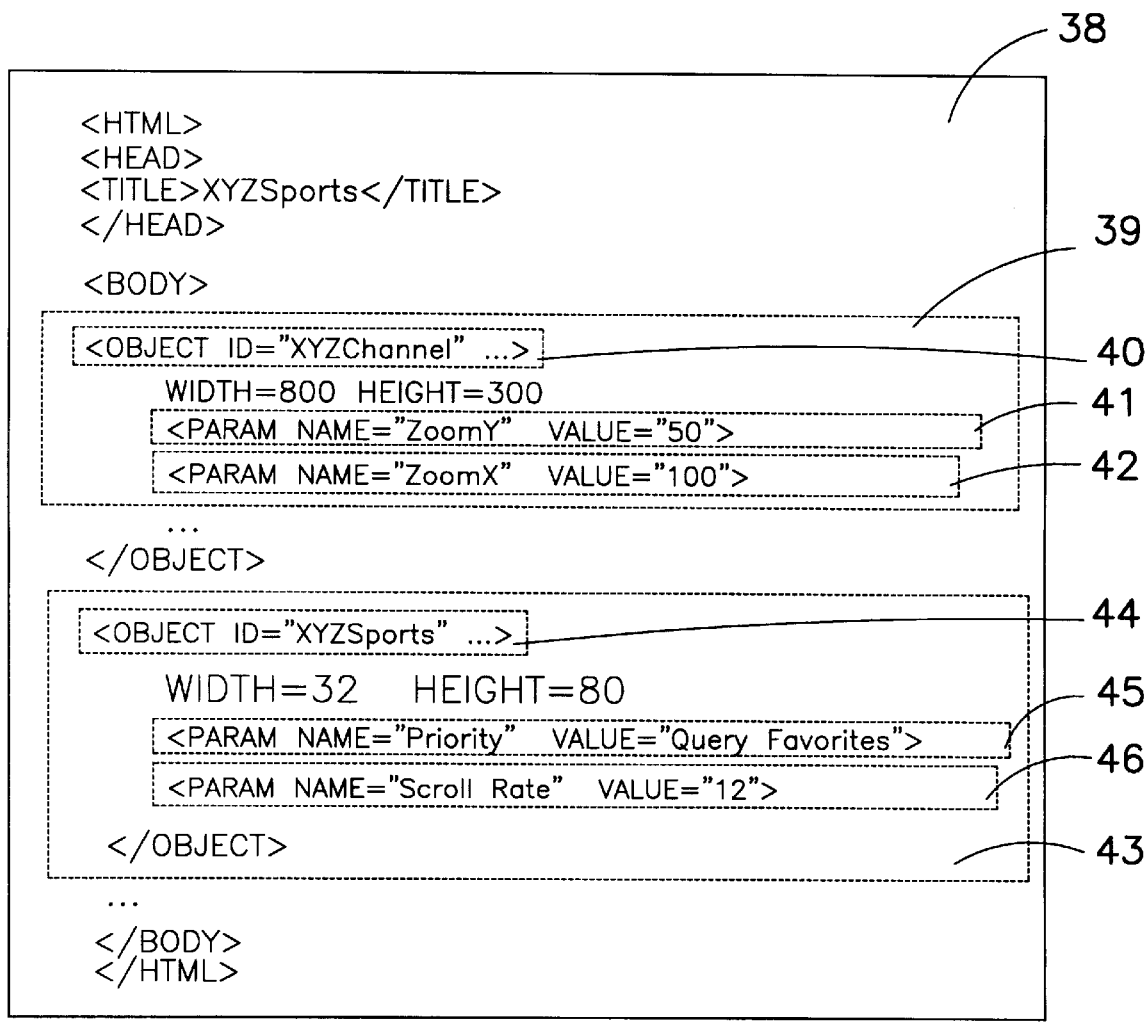

If the user selects a "sports" menu item that is displayed as an option from XYZ menu 33, the screen illustrated in FIG. 6(a) is displayed. FIG. 6(b) illustrates HTML-pseudocode 38 providing data services display area 37 which overlays television video 36.

Sample HTML-pseudocode 38 in FIG. 6(b) includes TV object 39 and data services object 43. TV object 39 displays XYZ channel video 30 at 50% vertical 41 and 100% horizontal 42. Second object 43 describes XYZ Sports services 44 that appears at the bottom of the screen. First parameter 45 tells sports services 44 to query the user's system for their favorite sports; second parameter 46 identifies the rate at which the sports scores scrolls.

Figure 7A:
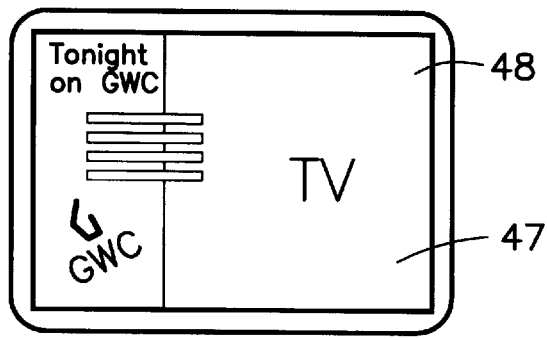
FIGS. 7(a)–(b) illustrate a HTML-pseudocode providing an electronic programming guide which overlays a television video.
Figure 7B:
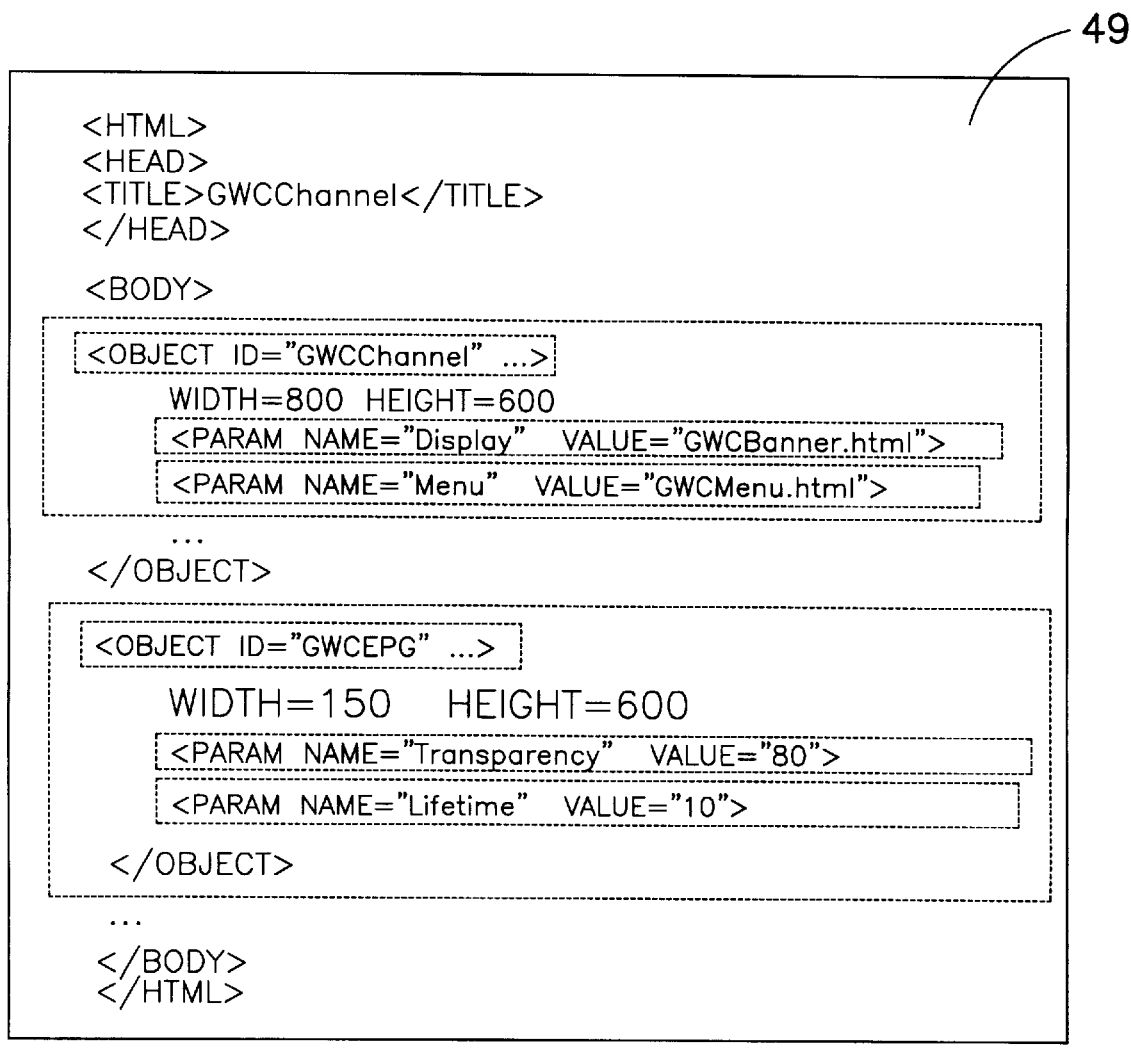

FIGS. 7(a)–(b) illustrates HTML-pseudocode 49 controlling the display of an electronic programming guide 48 which overlays television video 47. This also illustrates how a GWC channel (i.e., a Gateway channel) might differ from an XYZ channel. Television video 47 is overlaid with electronic program guide 48 that has been tailored to GWC. Sample HTML-pseudocode 49 is described in FIG. 7(b).

The application of HTML-psuedocodes allows for a considerable level of functionality on a single page. For instance, compare the layouts between GWC, as illustrated in FIG. 7(a) with that of XYZ, as illustrated in FIGS. 4(a), 5(a) and 6(a). This functionality is easily achieved with ActiveX, Java and NetScape Plug-Ins.

As illustrated in FIGS. 3–7, the present invention allows a broadcaster to control the layout of graphics in a television environment by utilizing the graphics layout language HTML. However, operating environments other than HTML are acceptable.

Each television channel is essentially a web page designed by the broadcaster. With the use of plug-ins acting as extensions to web browsers, such as Netscape Navigator and Microsoft Internet Explorer, these plug-ins add functionality to and/or extend the range of data types that can be used with the web browsers. Plug-ins are specifically described in *Using HTML 3.2. Java 1.1 and CGI* (Platinum Edition), authored by Eric Ladd and Jim O'Donnell (Que Corporation: 1996), which is hereby incorporated by reference.

Currently, television type user interfaces are manufacturer-specific embedded systems in which each user interface component is either part of a single executable, or the graphics and behavior are part of a collection of executables. With the present invention, each user interface component is componentized into objects that define their individual behaviors and presentations. Data files using the hypertext markup language (HTML) lays out these objects on screen 1. By varying the HTML data files, control is provided to the broadcaster over what objects are displayed on screen 1, where they are placed on screen 1 and to a limited effect, their behavior. This can be accomplished without re-writing the executables as would be necessary in other television type user interface implementations.

HTML also provides a means of updating the user interface via a network interface. If a newer version of a component is available, it may be used the next time the user accesses the network through any means. Other television type user interfaces either require that a hardware component be replaced, an electronic memory be burned or a software update load be initiated.

User interface components are developed as objects that can be embedded in an HTML format. The components can be implemented using Microsoft's ActiveX programming interfaces, Java or any other HTML-compatible tool or format. An HTML file is defined which lays out the objects within a predetermined space. The HTML file is loaded by an HTML interpreter control object (such as a web browser control) which is in itself contained by a generic user interface container. A generic user interface container provides general purpose behaviors which are independent of the individual components identified in the HTML file.

In general, the generic user interface container has no visual representations, the objects embedded in the HTML file provide the visual representation. The generic user interface containers are themselves embedded in an HTML file which specifies what user interface containers are available to the system as a whole.

Figure 8:
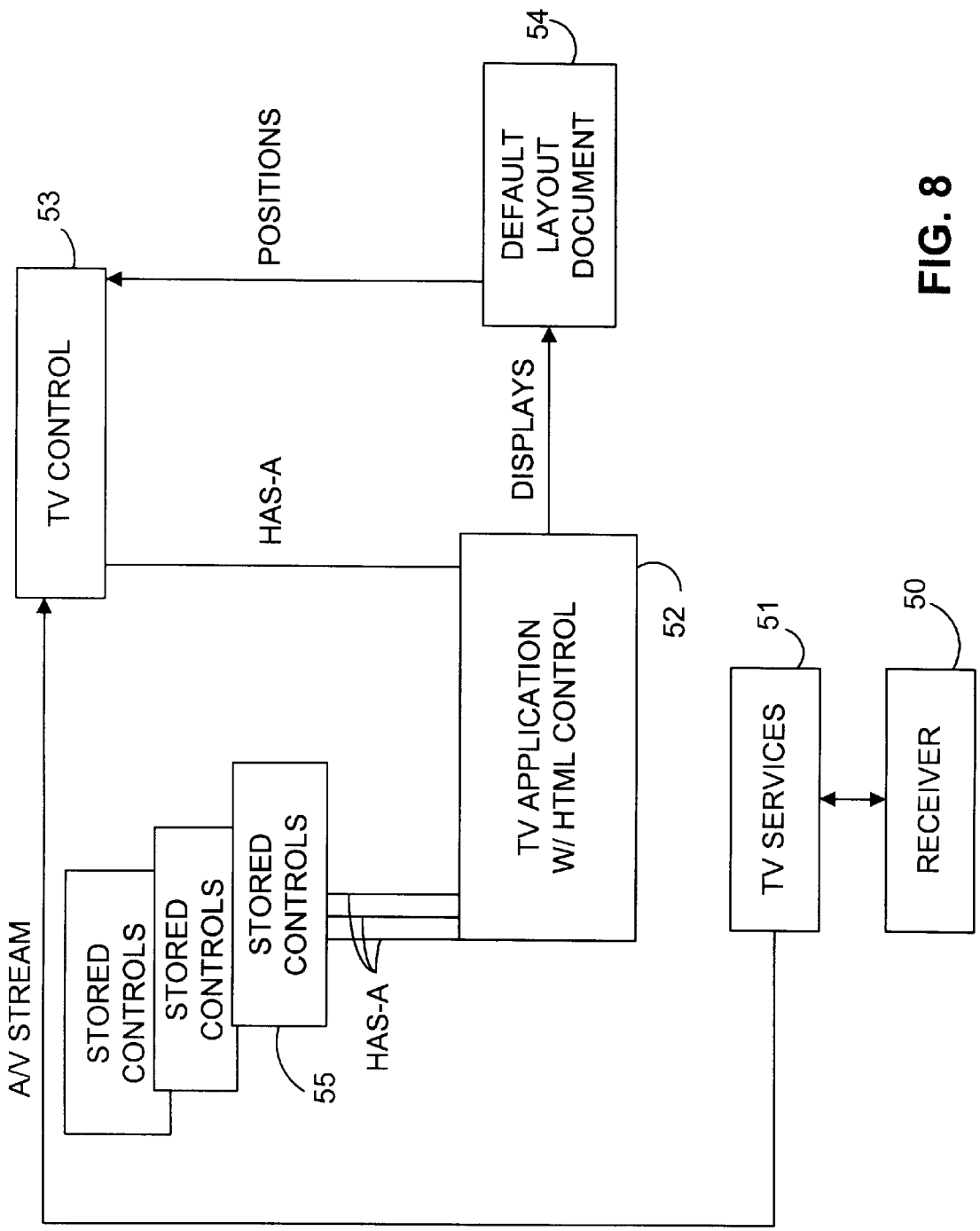
FIG. 8 is a representation of the various television components that provide television capability for the present invention.

FIG. 8 is a representation of the various television components that provide television capability for the present invention. Receiver 50 interfaces with TV services software component 51. TV services component 51 provides audio and video control interfaces to television control 53. Television control 53 interfaces television application 52. Television application 52 also manages a set of controls 55 that may appear on some channels.

When the user changes channels, television application 52 calls the appropriate function in TV services 51, which in turn, tunes receiver 50. Television application 52 coordinates displays through default layout 54. The new channel may have a different layout already stored on the machine (either by the manufacturer or the broadcaster), or a new layout may be sent in-band with the audio and video, or the layout may be sent out-of-band (through an internet connection, for example).

Figure 9:
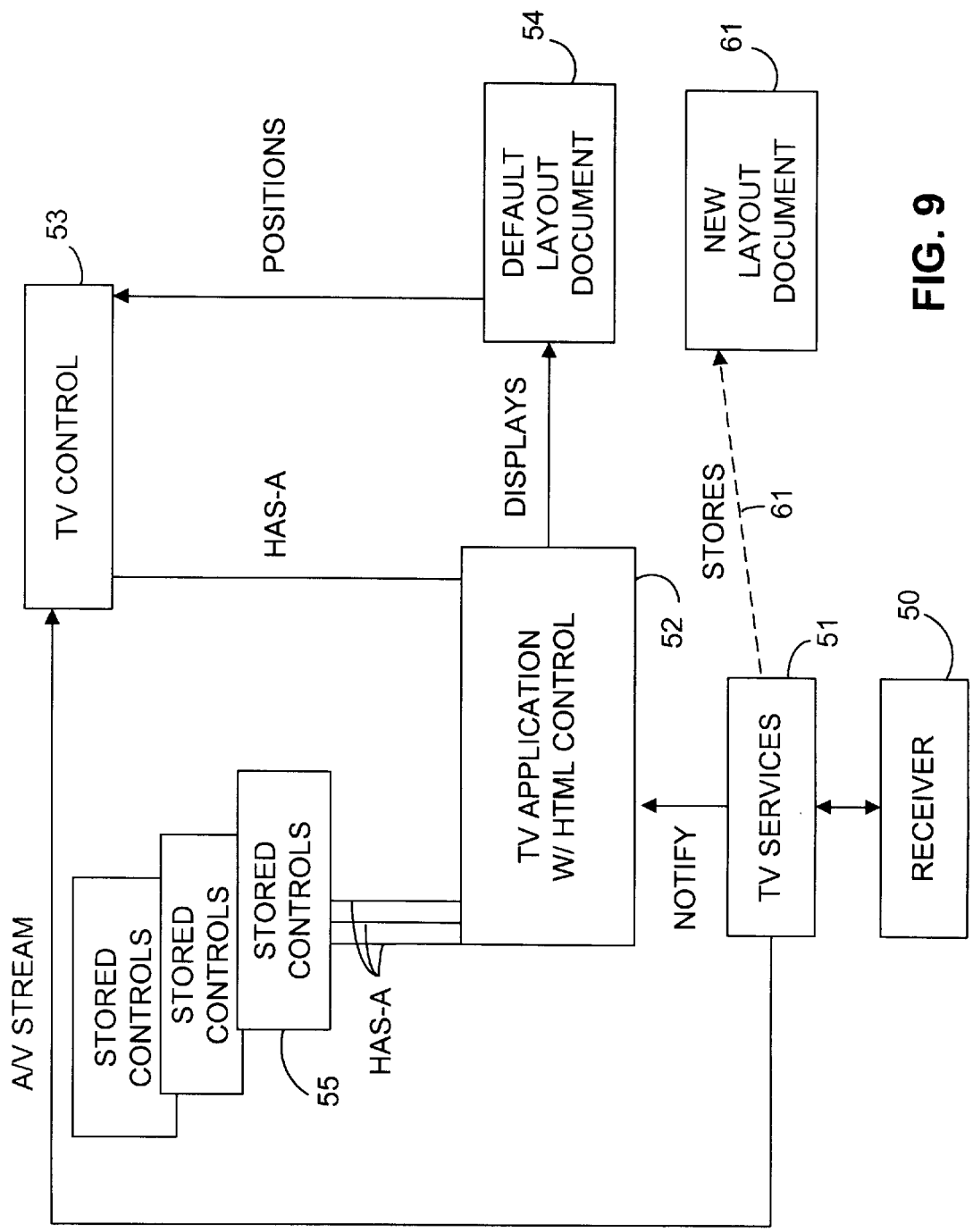
FIG. 9 illustrates a new page layout received in-band by the television components.
Figure 10:
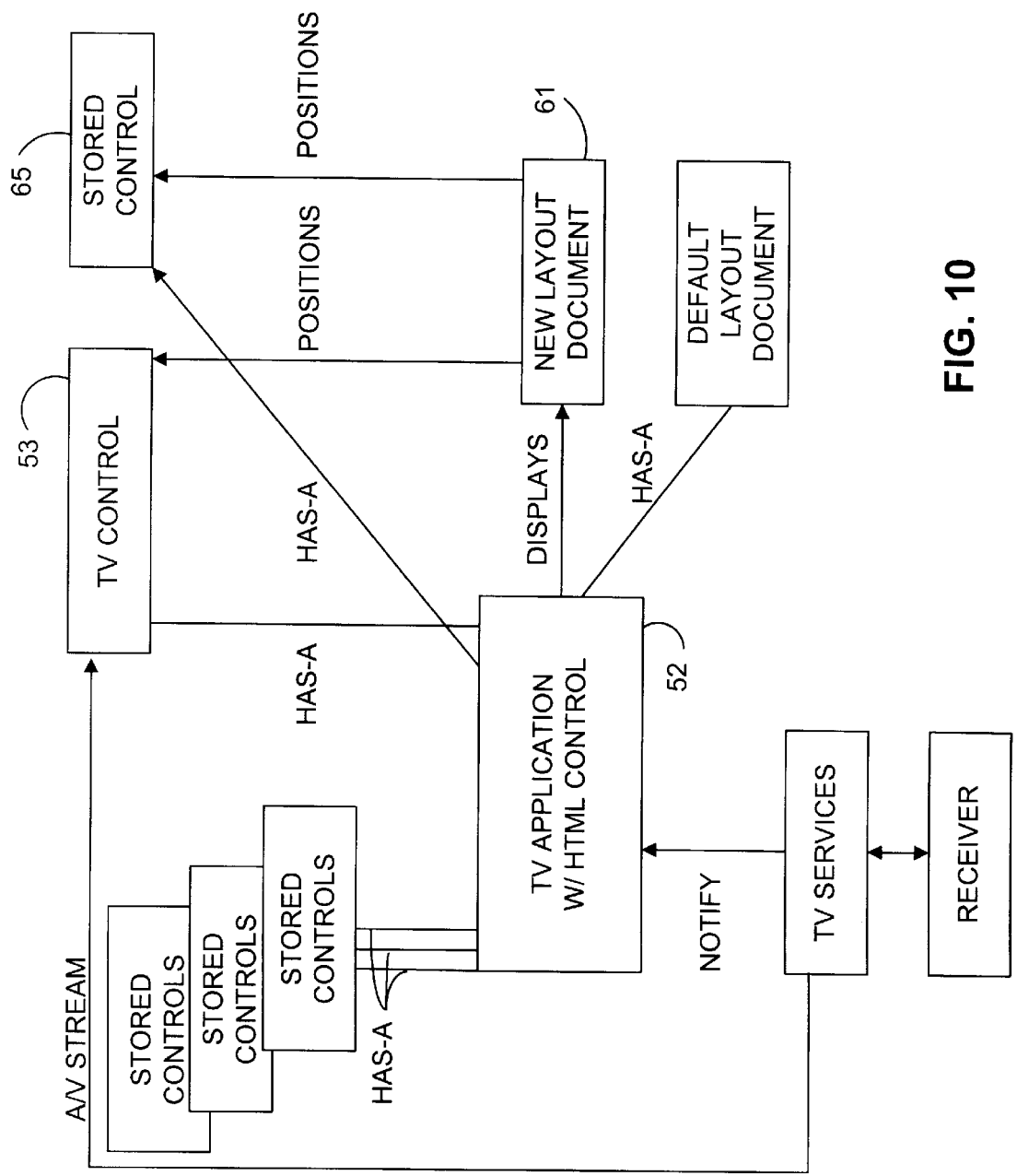
FIG. 10 illustrates the display of a new page layout by the television components.

FIG. 9 illustrates new page layout 61 received in-band. Receiver 50 sends new page layout 61 to TV services functions 51 which stores the layout. When appropriate, TV services function 51 notifies television application 52. Television application 52 coordinates displays through default layout 54. The new channel may have a different layout already stored on the machine or a new layout may be sent in-band or out-of-band with the audio and video. FIG. 10 illustrates the display of new page layout 61. New page layout 61 continues to display TV control 53, but may also show previously stored control 65.

In addition, the definition of screen 1, as referenced in FIG. 3, may be broadcast to the user in-line with the video content. With analog televisions, Intercast and WavePhore technologies send data over the vertical blanking interval (VBI). With digital televisions, MPEG-2 can transport data streams multiplexed with the video and audio elementary streams. Furthermore, the broadcaster can update their user interfaces dynamically through any network interface, such as a modem, cable network or satellite link.

The system just described operates within computer 110 which operates in what is known in the art as a "convergence environment," such that PC capability and TV capability are both provided. As a result of a television capability operating in this type of environment, the system of the present invention allows a broadcaster to use a graphics layout language, such as HTML, to control the placement of television status displays interactively with other information or icons that may be simultaneously displayed on the same screen. By varying the HTML data files, control is provided to the broadcaster over what objects are displayed on screen 1, where they are placed on screen 1 and to a limited effect, their behavior. This can be accomplished without re-writing the executables as would be necessary in other television type user interface implementations.

Although specific embodiments have been illustrated and described herein, it will be appreciated by those skilled in the art that any arrangement which is calculated to achieve the same purpose may be substituted for the specific embodiment of the present invention. This application is intended to cover any adaptations or variations of the present invention. Therefore, it is manifestly intended that this invention be limited only by the following claims and equivalents

What is claimed is:

1. A computerized system comprising:
 a plurality of graphical viewing configurations; and
 a plurality of television viewing configurations;
 wherein the graphical viewing configurations are overlaid with corresponding television viewing configurations such that each graphical viewing configuration is independently definable in size, position and relationship with respect to the television viewing configuration.

2. The computerized system of claim 1, wherein the graphical viewing configuration is updated through a network interface.

3. A method of controlling graphics in a television environment; comprising the steps of:
 creating a data file using a graphics layout language;
 displaying a television image on a screen; and
 displaying a graphics image on the screen,
 wherein the graphics image is overlaid with the television image, wherein the data file determines the layout of the graphics image on the screen such that there is an independent relationship between the graphics image and the television image.

4. The method of claim 3, wherein the graphics layout language is a hypertext markup language (HTML).

5. The method of claim 3, wherein the data files are updated via a network interface.

6. A computer-readable medium having computer-executable instructions for performing steps comprising:
 creating a data file using a hypertext markup language (HTML);
 displaying a television image on a screen; and
 displaying the graphics image overlaid on the screen with the television image, wherein the data file determines the layout of the graphics image on the screen such that there is an independent relationship between the graphics image and the television image.

* * * * *